US011456592B2

(12) United States Patent
Kontos et al.

(10) Patent No.: US 11,456,592 B2
(45) Date of Patent: Sep. 27, 2022

(54) METHOD FOR THE FAULT MANAGEMENT OF A FAULT IN A DC VOLTAGE LINE AND CONVERTER ASSEMBLY FOR CARRYING OUT THE METHOD

(71) Applicant: Siemens Energy Global GmbH & Co. KG, Munich (DE)

(72) Inventors: Epameinondas Kontos, Nuremberg (DE); Kilian Dallmer-Zerbe, Bubenreuth (DE); Dominik Ergin, Baiersdorf (DE); Ilhom Gafur, Nuremberg (DE); Sebastian Semmler, Nuremberg (DE)

(73) Assignee: Siemens Energy Global GmbH & Co. KG, Munich (DE)

( * ) Notice: Subject to any disclaimer, the term of this patent is extended or adjusted under 35 U.S.C. 154(b) by 127 days.

(21) Appl. No.: 16/861,439

(22) Filed: Apr. 29, 2020

(65) Prior Publication Data

US 2020/0343717 A1    Oct. 29, 2020

(30) Foreign Application Priority Data

Apr. 29, 2019  (EP) .................... 19171572

(51) Int. Cl.
*H02H 7/125* (2006.01)
*H02H 1/00* (2006.01)
*H02M 7/217* (2006.01)

(52) U.S. Cl.
CPC ........ *H02H 7/1255* (2013.01); *H02H 1/0007* (2013.01); *H02M 7/217* (2013.01)

(58) Field of Classification Search
CPC .... H02H 7/1255; H02H 7/1227; H02H 7/125; H02H 7/1252; H02H 7/1225;
(Continued)

(56) References Cited

U.S. PATENT DOCUMENTS

2012/0243282 A1*  9/2012  Marquardt ............. H02M 7/49
                                                      363/132
2013/0148392 A1*  6/2013  Inoue .................... H02M 7/10
                                                      363/68
(Continued)

FOREIGN PATENT DOCUMENTS

CN    106953347 A    7/2017
CN    106953509 A    7/2017
(Continued)

OTHER PUBLICATIONS

Hofmann Viktor et al.: "Cell an Optimized Hybrid-MMC for HVDC", XP055628518, Gefunden im Internet: URL:https://ieeexplore.ieee.org/ielx7/7499335/7499336/07499380.pdf?tp=&arnumber=7499380&isnumber=7499336&ref=aHR0cHM6Ly9pZWVleHBsb3JlLmllZWUub3JnL2Fic3RyYWN0L2RvY3VtZW50Lzc0OTkzODA=; [gefunden am Oct. 3, 2019]; pp. 361; Figure 1; 2016.

(Continued)

*Primary Examiner* — Nguyen Tran
(74) *Attorney, Agent, or Firm* — Laurence A. Greenberg; Werner H. Stemer; Ralph E. Locher

(57) ABSTRACT

A method manages a fault on a DC voltage side of a converter assembly including a modular multistage converter with switching modules having semiconductor switches and an energy store. Some switching modules are a first type and others are a second type. During operation, a positive switching module voltage, negative switching module voltage or zero voltage are generated at terminals of switching modules of the first type, and a positive switching module voltage or zero voltage are generated at terminals of switching modules of the second type. Upon detecting a DC voltage side fault, switching modules of the first type are actuated such that the polarity of their energy store voltages corresponds to the polarity of a fault current, and energy stores of switching modules of the first type are charged to (Continued)

a voltage exceeding their rated voltage. A converter assembly carrying out the method is also provided.

11 Claims, 3 Drawing Sheets

(58) Field of Classification Search
CPC .. H02H 7/1257; H02M 7/217; H02M 7/2176; H02M 7/219; H02M 7/23
See application file for complete search history.

(56) References Cited

U.S. PATENT DOCUMENTS

| | | | |
|---|---|---|---|
| 2014/0198533 A1* | 7/2014 | Bala | H02M 7/4837 |
| | | | 363/16 |
| 2018/0076735 A1* | 3/2018 | Bakran | H02M 7/49 |
| 2018/0166972 A1 | 6/2018 | Qi et al. | |

FOREIGN PATENT DOCUMENTS

| | | |
|---|---|---|
| CN | 207559578 U | 6/2018 |
| CN | 208738855 U | 4/2019 |

OTHER PUBLICATIONS

Lebre, Jose R. et al.: "POD-PWM Applied to Circulating Current Control in HVDC-MMC Based System"; 2015; IEEE.

* cited by examiner

METHOD FOR THE FAULT MANAGEMENT OF A FAULT IN A DC VOLTAGE LINE AND CONVERTER ASSEMBLY FOR CARRYING OUT THE METHOD

CROSS-REFERENCE TO RELATED APPLICATION

This application claims the priority, under 35 U.S.C. § 119, of European Patent Application EP 19 171 572, filed Apr. 29, 2019; the prior application is herewith incorporated by reference in its entirety.

BACKGROUND OF THE INVENTION

Field of the Invention

The invention relates to a method for the fault management of a fault on a DC voltage side of a converter assembly having a modular multi-stage converter including switching modules each having a plurality of semiconductor switches and at least one energy store, wherein some of the switching modules are switching modules of a first type and some other switching modules are switching modules of a second type, during operation of the converter assembly, a positive switching module voltage, a negative switching module voltage or a zero voltage are respectively generated at terminals of the switching modules of the first type, and a positive switching module voltage or a zero voltage are respectively generated at terminals of the switching modules of the second type. The converter assembly includes a DC voltage side for connecting to a DC voltage line or a DC voltage grid, for example a high-voltage DC transmission line. The converter assembly further includes an AC voltage side for connecting to an AC voltage grid, for example an electricity transmission grid. In particular, the converter assembly is configured for the conversion of an AC voltage on the AC voltage grid into a DC voltage, or vice versa.

A converter assembly of the above-mentioned type is known from the paper "Optimized Design of a Hybrid-MMC and Evaluation of Different MMC Topologies" by Viktor Hoffmann and Mark-M. Bakran (EPE'16 ECCE Europe). A converter assembly having a modular multi-stage converter, which is disclosed therein, is connected between an AC voltage grid and a DC voltage grid. The multi-stage converter includes six converter arms with switching modules, which are respectively disposed between a DC voltage terminal and an AC voltage terminal. In each converter arm, two types of switching modules are employed, namely, full-bridge switching modules and half-bridge switching modules. In the known converter assembly, an arm voltage Varm is generated in the converter arms, in accordance with the formula Varm=VDC/2+m*VDC/2*sin(omega*t+phi), where VDC represents a DC voltage side voltage, omega represents a (circuit) frequency, t represents time and m represents a modulation index, which is defined as m=2*VACpeak/VDC. Through the use of the generated arm voltage, a corresponding arm current can be generated. VACpeak is preferably the conductor midpoint voltage of the AC system.

One challenge in high-voltage direct current transmission systems is the detection and management of insulation faults on the DC voltage side of the converter assembly, i.e. faults which are located in the DC voltage line or in the DC voltage grid. Those insulation faults can be associated, for example, with environment-related short-circuits between individual conductors or with ground faults. The rapid and reliable management of such faults plays a key role. In a particularly unfavorable case, however, a DC voltage side fault can result in damage to the converter assembly. A customary procedure for fault management involves the isolation of the converter assembly from the AC voltage grid, followed by a relatively long waiting period, until the DC voltage side fault is cleared.

A DC voltage side fault can result in a massive rise in the DC voltage side current Idc, according to the following equation: dIdc/dt=(Uconv−Udc)/Lconv, where Uconv is the rated DC side voltage set on the multi-stage converter, Udc is the voltage in the DC voltage grid, and Lconv is the overall inductance of the converter assembly. Accordingly, for the active reduction of the DC voltage side current Idc, a reduction or even a polarity reversal of the converter voltage Uconv is required.

BRIEF SUMMARY OF THE INVENTION

It is accordingly an object of the invention to provide a method for the fault management of a fault in a DC voltage line and a converter assembly for carrying out the method, which overcome the hereinafore-mentioned disadvantages of the heretofore-known methods and assemblies of this general type and which permit the most reliable and efficient fault management possible.

With the foregoing and other objects in view there is provided, in accordance with the invention, a method for the fault management of a fault on a DC voltage side of a converter assembly having a modular multi-stage converter which incorporates switching modules, each of which includes a plurality of semiconductor switches and at least one energy store, wherein some of the switching modules are switching modules of a first type, and some other switching modules are switching modules of a second type, during the operation of the converter assembly, a positive switching module voltage, a negative switching module voltage or a zero voltage are respectively generated at terminals of the switching modules of the first type, and a positive switching module voltage or a zero voltage are respectively generated at terminals of the switching modules of the second type, the DC voltage side fault is detected, the switching modules of the first type are actuated in such a way that the polarity of their energy store voltages corresponds to the polarity of a fault current, and the energy stores of the switching modules of the first type are charged to a voltage in excess of their rated voltage.

According to the invention, the switching modules of the first type are thus employed to achieve the above-mentioned polarity reversal of the converter voltage Uconv. In a modular multi-stage converter, the converter voltage Uconv which can be generated is equal to the sum of the voltages which can be generated by using the switching modules (switching module voltages) in the converter arms concerned. It should be observed that the capability of the converter to generate a sufficiently high negative voltage is dependent upon the number of switching modules of the first type employed. However, if the number of these switching modules in each converter arm is increased correspondingly, operating costs for the entire converter assembly are simultaneously increased, based on the customarily higher electrical losses in switching modules of the first type, in comparison with those in switching modules of the second type. According to the invention, it has been observed that the efficiency of fault management can be improved by the operation of the switching modules of the first type, during fault management, at a voltage in excess of their rated voltage. The rated voltage signifies the upper limit of a rated voltage range, i.e. the range within which the switching modules are configured for normal rated operation. The duration of fault management is generally relatively short (in the region of up to a few seconds) such that, during this short duration, the switching modules can be operated with a voltage which is higher than the operating voltage, for example by a factor of 1.1 to 1.5. In this manner, advantageously, fault management in the above-mentioned converter can be reliably executed with no increase in operating costs. According to the invention, the switching modules of the first type are charged to a voltage in excess of their rated voltage. To this end, the switching modules of the first type are actuated in such a way that the polarity of their energy store voltages corresponds to the polarity of a fault current. The fault current flows in a direction which is dictated by the fault (whereby the polarity thereof is determined), through the converter assembly and thus also through the switching modules. If the polarity of the fault current and the polarity of the energy store are the same, the energy store is charged, until the current flux through the energy store is interrupted or is diverted to another current path. Actuation of the switching modules is initiated by the actuation of the semiconductor switches. Correspondingly, the semiconductor switches can be appropriate controllable and interruptible semiconductor switches such as, for example, IGBTs, IGCTs, MOSFETs or similar. Fault detection can be executed in any appropriate manner which is familiar to a person skilled in the art. For example, monitoring of the DC voltage side voltage, and the collapse thereof in the event of a fault, is possible. Likewise, a corresponding voltage rise on the DC voltage side of the converter assembly can be detected.

A significantly improved capacity utilization of existing hardware can be achieved by the charging of the bipolar and settable switching modules (switching modules of the first type) in a modular multi-stage converter having both switching module types in each converter arm. It is thus possible to reduce the number of switching modules of the first type installed, thereby resulting in the reduction of losses or the cost of losses, and of hardware costs.

Preferably, zero-current control is activated on the converter assembly. Correspondingly, a target current value of zero is specified for control. Preferably, a DC voltage side converter voltage is established at a negative value. In this manner, a current zero-crossing can be generated in any event. Activation of zero-current control appropriately signifies that a switchover is executed between normal control, for the normal operation or rated operation of the converter assembly, and a separate fault management control. Both types of control can be loaded in a control device of the converter assembly. In this particularly simple manner, charging of the energy stores of the switching modules of the first type can be achieved.

The rated voltage of the switching modules of the first type and/or of the second type preferably lies between 1 kV and 5 kV. A relatively small number of switching modules can be sufficient, even for a voltage setting of several hundred kilovolts by the employment of switching modules in the high-voltage range.

A particularly advantageous form of switching modules of the first type are full-bridge switching modules, which will be known to a person skilled in the art. These are a particularly favorable variant of switching modules of the first type. Further examples of switching modules of the first type are the "clamp-double half-bridge module," the "cross-connected half-bridge module" and the "clamp-double full-bridge module." All of the switching modules of the first type are preferably, but not necessarily, of an identical construction.

Preferably, the switching modules of the second type are half-bridge switching modules. Although half-bridge switching modules cannot contribute to the constitution of the negative voltage, they permit relatively low operating costs based on their relatively low electrical loss during operation. All of the switching modules of the second type are preferably, but not necessarily, of an identical construction.

The DC voltage side current is appropriately regulated to zero. However, it is also possible for fault management, by way of special control, to be terminated, if an absolute magnitude of the DC voltage side current falls below a predefined current threshold, and specifically remains there for a predefined time interval. Appropriately, this is a condition which needs to be fulfilled for the commencement of a "recovery trial," i.e. for the restoration of rated operation.

According to one form of embodiment of the invention, by using an additional DC voltage side parallel path incorporating a diode and an arrester, a negative DC voltage side voltage is limited. The parallel path can be disposed between a DC voltage pole and ground. The diode can naturally also include an appropriate number of individual diode elements. Limitation of the negative voltage is particularly advantageous in the event of a DC voltage side fault. Due to the execution of fault-response processes on the DC voltage side, voltage ripples can occur, which can be displaced or propagated along the DC voltage side between the converter assembly and the site of the fault. As a result of travelling waves of this type, negative voltages are generated. The amplitude, waveform and duration of the negative voltage is dependent upon the type of conductor and the site of the fault. The amplitude of the negative voltage can be even higher than the original DC voltage prior to the occurrence of a fault. The diode/arrester path limits this negative voltage before it reaches the converter and can cause any damage to the latter.

A transition to normal operation is appropriately executed further to the expiry of a deionization time. The deionization time is the time required for the quenching of an arc at the site of the fault, in such a way that the insulating properties of the contact gap are restored, by way of the restoration of dielectric withstand at the site of the fault.

With the objects of the invention in view, there is concomitantly provided a converter assembly having a modular multi-stage converter including switching modules each of which includes a plurality of semiconductor switches and at least one energy store, wherein some of the switching modules are switching modules of a first type, and some other switching modules are switching modules of a second type, during the operation of the converter assembly, a positive switching module voltage, a negative switching module voltage or a zero voltage are respectively generated at terminals of the switching modules of the first type, and a positive switching module voltage or a zero voltage are respectively generated at terminals of the switching modules of the second type.

The object of the invention is the disclosure of a converter assembly of this type which permits the most reliable and efficient fault management possible of DC voltage side faults.

The invention, in a generic converter assembly according to the invention, is fulfilled by a control device which is configured for the execution of a method according to the invention.

The advantages of the converter assembly according to the invention proceed in particular from the advantages which have been described in conjunction with the method according to the invention.

Other features which are considered as characteristic for the invention are set forth in the appended claims.

Although the invention is illustrated and described herein as embodied in a method for the fault management of a fault in a DC voltage line and a converter assembly for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
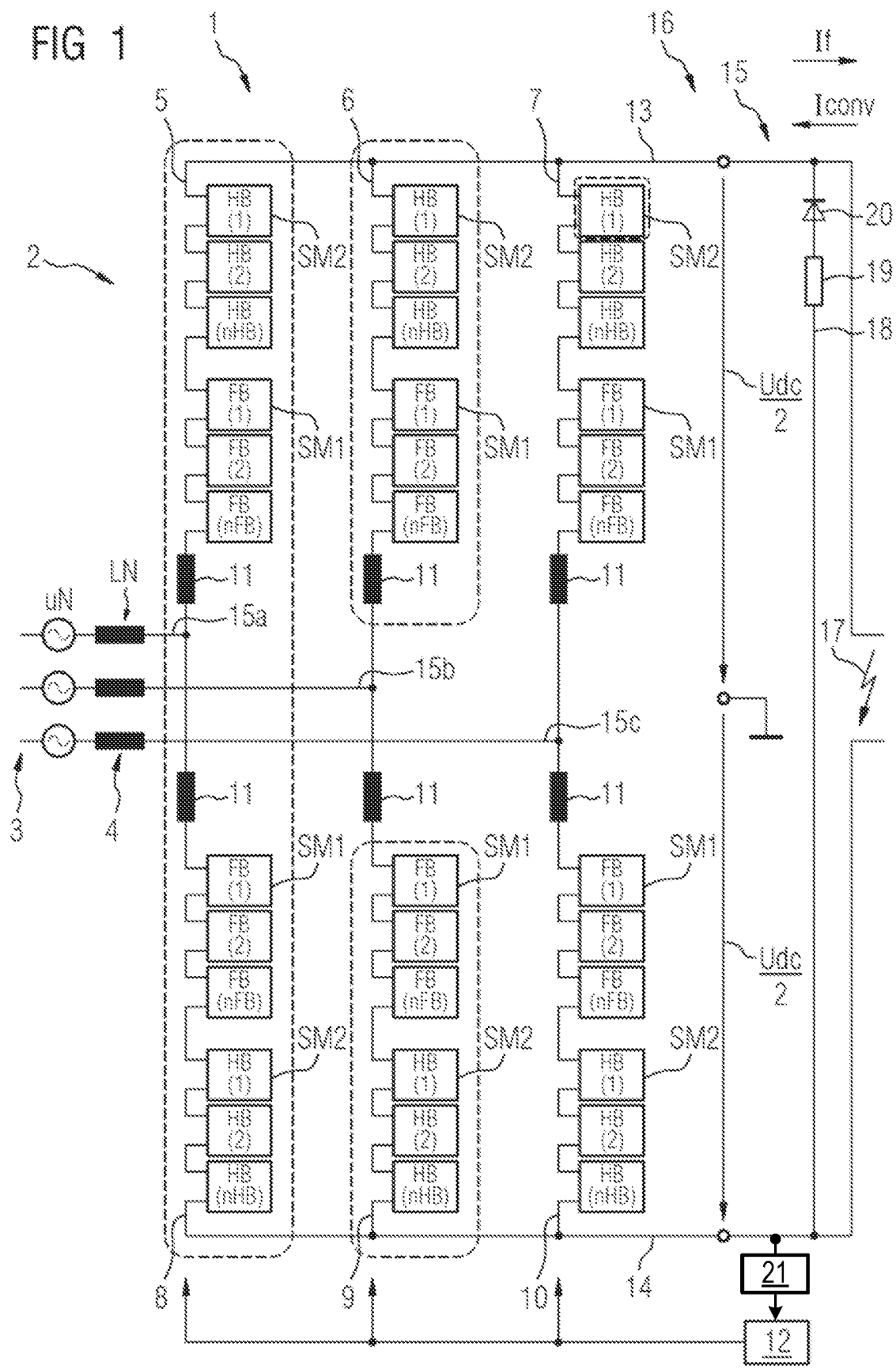
FIG. 1 is a schematic diagram of an exemplary embodiment of a converter assembly according to the invention.

Referring now to the figures of the drawings in detail and first, particularly, to FIG. 1 thereof, there is seen a converter assembly 1. The converter assembly 1 includes semiconductor switches in switching modules, which are connected to constitute a modular multi-stage converter (MMC) 2 which, in the example represented, is configured for the conversion of an AC voltage of an AC voltage grid 3, to which the MMC 2 is connected by using a network transformer 4 (wherein only the secondary side windings LN are diagrammatically represented), into a DC voltage Udc.

The MMC 2 includes six converter arms 5-10, which are interconnected in a double-star circuit configuration. Each of the identically structured converter arms 5-10 includes an arm inductance 11 and a series circuit of two-pole switching modules SM1 of the first type and switching modules SM2 of the second type. In principle, the number of switching modules SM1 or SM2 in each converter branch 5-10 is arbitrary, and is adaptable to the respective application. The switching modules SM1 of the first type can, for example, be full-bridge switching modules, and the switching modules SM2 of the second type can, for example, be half-bridge switching modules, the structure of which will be addressed in greater detail with reference to the subsequent FIGS. 2 and 3. Each switching module SM includes controllable semiconductor switches, e.g. IGBTs or similar, an energy store and a control unit, by using which the semiconductor switches can be actuated. In principle, the converter assembly 1 is not limited to the employment of exactly two different switching module types, such that it is conceivable, moreover, that the converter assembly employed might incorporate further switching module types.

The converter assembly or installation 1 further includes a central control device or controller 12, which is configured for the control of the MMC 2 and for the actuation of the switching modules SM. The control device 12 receives instructions from a superordinate authority with respect to the requisite active power and reactive power, which are converted by the control unit into target values for a number of control parameters. The control parameters can, for example, be an AC voltage side voltage Uac, an AC voltage side current Iac, a DC voltage side current Iconv and/or a DC voltage side voltage Udc. In converter installations which are constructed in the form of a symmetrical monopole, a voltage between the positive DC voltage pole 13 and the ground potential, Udc+=Udc/2, and a voltage between the negative DC voltage pole 14 and the ground potential, Udc−=Udc/2, are of significance. The two DC voltage poles 13, 14 are connected on a DC voltage side 16 of the converter assembly to a DC voltage line 15. A lightning symbol 17 indicates a pole-to-pole fault on the DC voltage side 16. The current direction of the corresponding fault current is indicated in FIG. 1 by an arrow If. According to convention, the polarity of Iconv is described as positive. Likewise, the polarity of the voltages Udc/2 represented in FIG. 1 is described as positive. This convention can be correspondingly translated to the switching module voltages USM1, USM2 of the individual switching modules SM1, SM2.

The converter assembly 1 further includes an additional DC voltage side parallel path 18, in which a diode 20 and an arrester 19 are disposed. Through the use of this additional parallel path 18, a negative voltage on the DC voltage side can be limited. In this manner, the negative impacts of "fault-related travelling wave effects" upon the converter 2 can be minimized.

Figure 2:
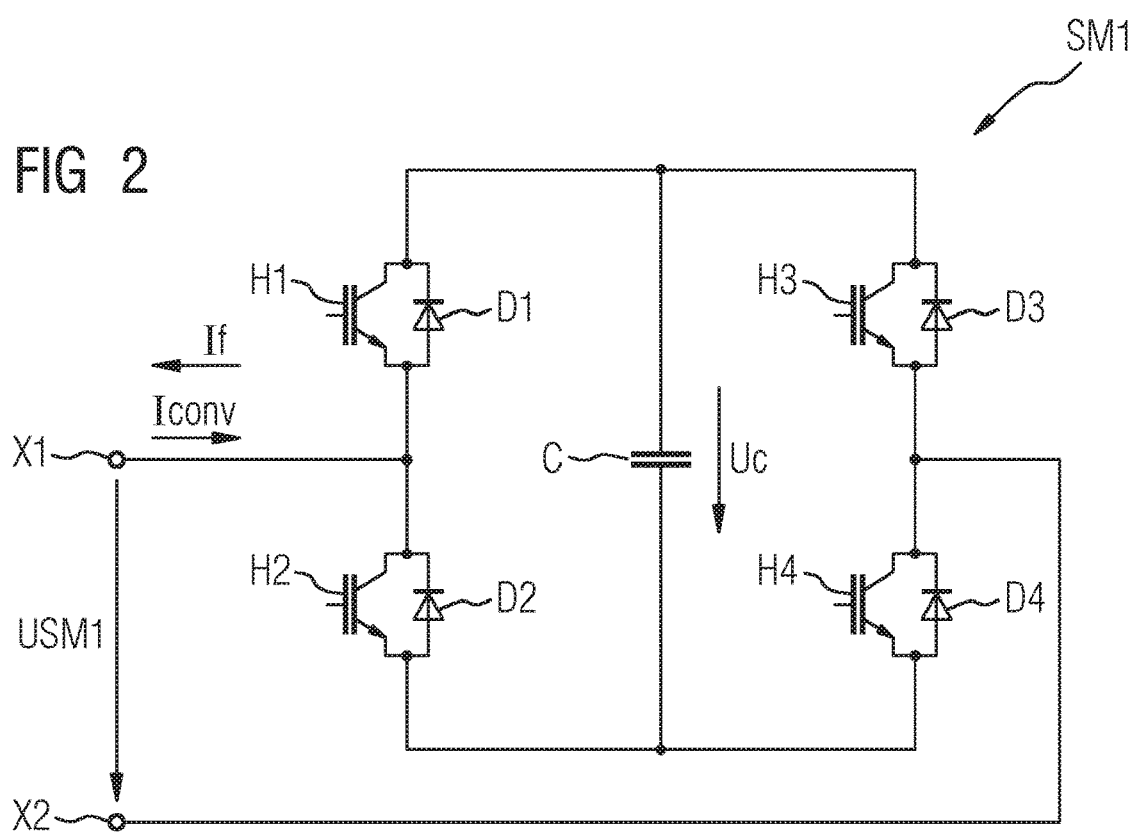
FIG. 2 is a schematic diagram of an example of a switching module of the first type.

FIG. 2 shows a switching module SM1 of the first type, which is appropriate for the converter according to FIG. 1, and is connected in a full-bridge circuit. The switching module SM1 includes a first interruptible semiconductor switch H1, with which a first freewheeling diode D1 is connected in an antiparallel configuration, and a second interruptible semiconductor switch H2, with which a second freewheeling diode D2 is connected in an antiparallel configuration. The first and second semiconductor switches H1, H2 are mutually connected in a first semiconductor series circuit, and assume the same forward direction. The switching module SM1 further includes a third interruptible semiconductor switch H3, with which a third freewheeling diode D3 is connected in an antiparallel configuration, and a fourth interruptible semiconductor switch H4, with which a fourth freewheeling diode D4 is connected in an antiparallel configuration. The third and the fourth semiconductor switches H3, H4 are mutually connected in a second semiconductor series circuit, and assume the same forward direction. The two semiconductor series circuits are disposed in parallel with one another, and with an energy store C in the form of a capacitor, on which a capacitor voltage Uc is present. Moreover, the switching module SM1 further includes a first terminal X1, which is disposed between the semiconductor switches H1, H2 of the first semiconductor series circuit, and a second terminal X2, which is disposed between the semiconductor switches H3, H4 of the second semiconductor series circuit. Through the appropriate actuation of the semiconductor switches H1-H4, a switching module voltage USM1 can be generated at the terminals X1, X2 which corresponds to the capacitor voltage Uc, to the negative capacitor voltage −Uc or to a zero voltage. The energy store C is rated for operation with an energy store or capacitor voltage which lies within a rated voltage range. For short periods, however, the energy store C can also operate at an increased voltage in relation thereto.

In the case represented in FIG. 2, it can be achieved by the blocking of the semiconductor switches H1 and H4, that the polarity of the fault current If corresponds to the polarity of the energy store voltage Uc. In this configuration, the energy store C receives energy, and is charged accordingly.

Figure 3:
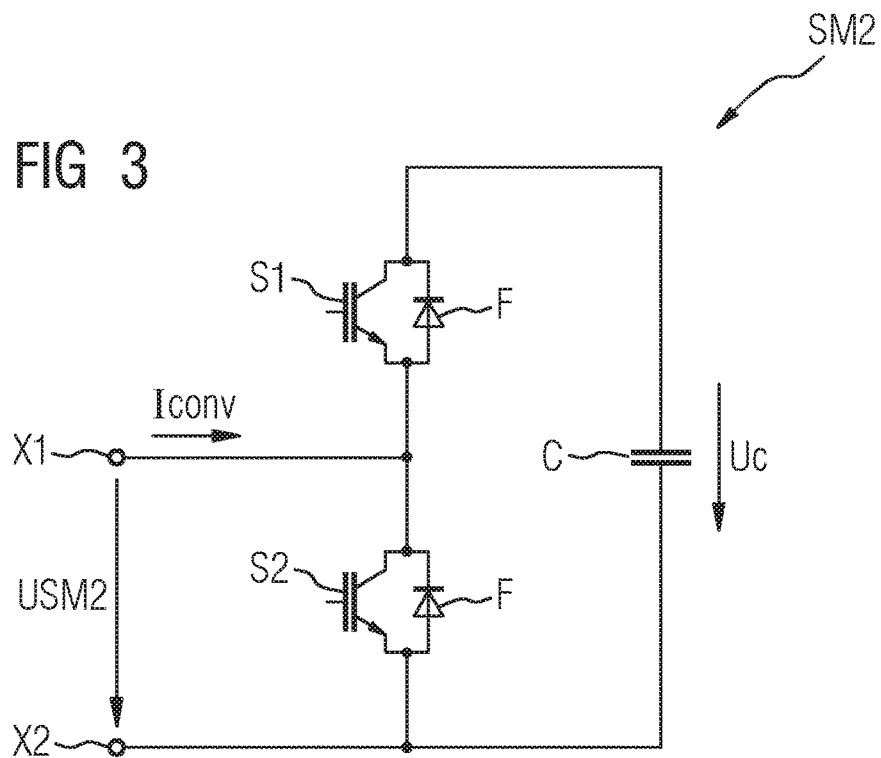
FIG. 3 is a schematic diagram of an example of a switching module of the second type.

FIG. 3 shows a switching module SM2 of the second type, which is appropriate for the converter according to FIG. 1 and is connected in a half-bridge circuit. A parallel circuit of a first semiconductor switch S1 and a capacitor C is disposed in one capacitor branch. A second semiconductor switch S2 is disposed in a bridge arm between two terminals X1, X2 of the switching module SM2. A freewheeling diode F is respectively connected in an antiparallel configuration with each of the two semiconductor switches S1, S2. Through the appropriate actuation of the two semiconductor switches S1, S2, a switching module voltage USM2 can be generated on the terminals X1, X2 which corresponds to the capacitor voltage Uc, or to a zero voltage.

Figure 4:
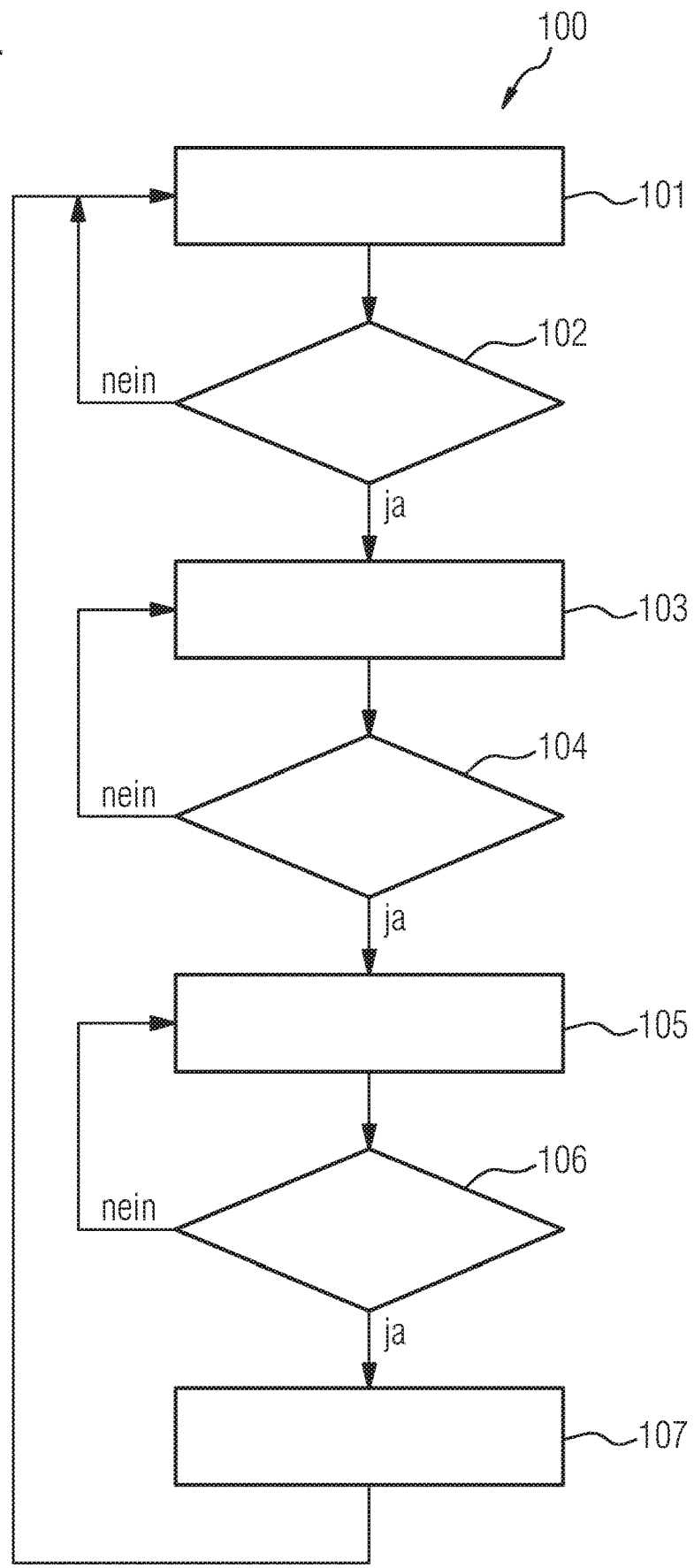
FIG. 4 is a flow diagram for an exemplary embodiment of a method according to the invention.

An exemplary embodiment of the method 100 according to the invention will be described with reference to the diagram represented in FIG. 4. The method can be executed, for example, by using the converter assembly according to FIGS. 1 to 3. Initially, the converter assembly is in normal operation 101 until, in a first process step 102, a DC voltage side fault is detected. To this end, one or more measuring devices 21 can be provided on the DC voltage side of the converter. An insulation fault on the DC line segment can be identified from the measuring signals thus obtained, by using various evaluation criteria. Information on the fault thus detected is transmitted to a control device of the converter assembly which, in a second process step 103, activates a zero-voltage control for the DC voltage side current Idc. The switching modules of the first type are actuated in such a way that the polarity of their energy store voltages corresponds to the polarity of a fault current, wherein the energy stores of the switching modules of the first type are charged to a voltage in excess of their rated voltage.

In a third process step 104, a check is executed as to whether the DC voltage side current Idc has quantitatively fallen below a predefined current threshold limit, wherein the current Idc is continuously monitored for this purpose. An additional condition can be provided, in that the current Idc, during a predefined time interval tlimit, remains below the current threshold Ilimit. If this condition or these conditions is/are fulfilled, in a fourth process step 105, an established deionization time is permitted to elapse. Immediately a check 106 indicates that the deionization time has elapsed and a recovery trial 107 is initiated. In the event of a successful recovery trial, the converter assembly is restored to normal operation.

The invention claimed is:

1. A method for the fault management of a fault on a DC voltage side of a converter assembly, the method comprising the following steps:
providing the converter assembly including a modular multi-stage converter having switching modules each including a plurality of semiconductor switches and at least one energy store;
providing some of the switching modules as switching modules of a first type having terminals and providing some others of the switching modules as switching modules of a second type having terminals;
during operation of the converter assembly, generating a positive switching module voltage, a negative switching module voltage or a zero voltage at the terminals of the switching modules of the first type, and generating a positive switching module voltage or a zero voltage at the terminals of the switching modules of the second type;
detecting a DC voltage side fault;
actuating the switching modules of the first type to cause a polarity of energy store voltages thereof to correspond to a polarity of a fault current; and
charging the energy stores of the switching modules of the first type to a voltage in excess of a rated voltage thereof.

2. The method according to claim 1, which further comprises establishing a target value for a DC voltage side converter voltage at a negative value.

3. The method according to claim 1, which further comprises setting the rated voltage of the switching modules of at least one of the first type or the second type between 1 kV and 5 kV.

4. The method according to claim 1, which further comprises providing the switching modules of the first type as full-bridge switching modules.

5. The method according to claim 1, which further comprises providing the switching modules of the second type as half-bridge switching modules.

6. The method according to claim 1, which further comprises regulating a DC voltage side current to zero.

7. The method according to claim 1, which further comprises terminating the fault management if an absolute magnitude of a DC voltage side current falls below a predefined current threshold and remains below the predefined current threshold for a predefined time interval.

8. The method according to claim 1, which further comprises using an additional DC voltage side parallel path including a diode and an arrester to limit a negative DC voltage side voltage.

9. The method according to claim 1, which further comprises carrying out a transition to normal operation upon an expiration of a deionization time.

10. The method according to claim 1, which further comprises operating the switching modules with a voltage being higher than an operating voltage by a factor of 1.1 to 1.5.

11. A converter assembly, comprising:
a modular multi-stage converter including switching modules;
each of said switching modules having a plurality of semiconductor switches and at least one energy store, some of said switching modules being switching modules of a first type having terminals, and some others of said switching modules being switching modules of a second type having terminals;
said switching modules of said first type configured to generate a positive switching module voltage, a negative switching module voltage or a zero voltage at said terminals of said switching modules of said first type during operation of the converter assembly;
said switching modules of said second type configured to generate a positive switching module voltage or a zero voltage at said terminals of said switching modules of said second type during operation of the converter assembly; and
a control device configured for:
detecting a DC voltage side fault;

actuating said switching modules of said first type to cause a polarity of energy store voltages thereof to correspond to a polarity of a fault current; and charging said energy stores of said switching modules of said first type to a voltage in excess of a rated voltage thereof.

\* \* \* \* \*